(12) United States Patent
Watanabe et al.

(10) Patent No.: US 6,688,452 B2
(45) Date of Patent: Feb. 10, 2004

(54) DRIVER AND AUTOMATIC PALLET CHANGER HAVING THE SAME

(75) Inventors: Michio Watanabe, Yamatokoriyama (JP); Takahisa Takemori, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 132 days.

(21) Appl. No.: 09/981,805

(22) Filed: Oct. 19, 2001

(65) Prior Publication Data

US 2002/0050439 A1 May 2, 2002

(30) Foreign Application Priority Data

Oct. 27, 2000 (JP) ........................................ 2000-329158

(51) Int. Cl.$^7$ .............................................. B65G 37/00
(52) U.S. Cl. .................. 198/346.1; 198/346.2
(58) Field of Search ............................ 198/346.1, 346.2; 417/429; 408/135, 136, 137; 82/117, 149

(56) References Cited

U.S. PATENT DOCUMENTS

| | | | | |
|---|---|---|---|---|
| 3,619,090 A | * | 11/1971 | Hartkopf | 417/426 |
| 3,955,902 A | * | 5/1976 | Kyvsgaard | 417/477 |
| 4,153,393 A | * | 5/1979 | Cook | 417/429 |
| 4,195,472 A | * | 4/1980 | Robinson | 60/39.16 |
| 4,887,345 A | * | 12/1989 | Saito et al. | 29/568 |
| 4,941,807 A | * | 7/1990 | Foster | 471/199.1 |
| 5,145,048 A | * | 9/1992 | Kitamura | 198/346.1 |
| 5,370,212 A | * | 12/1994 | Mizutani et al. | 198/346.1 |
| 5,813,514 A | * | 9/1998 | Keith | 198/346.2 |
| 5,887,430 A | * | 3/1999 | Hirai et al. | 60/433 |
| 6,148,988 A | * | 11/2000 | Lin et al. | 198/346.1 |
| 6,341,928 B1 | * | 1/2002 | Matsuoka et al. | 198/346.1 |
| 6,530,300 B2 | * | 3/2003 | Nakai et al. | 82/117 |

FOREIGN PATENT DOCUMENTS

JP          11-090759          4/1999

* cited by examiner

*Primary Examiner*—Douglas Hess
(74) *Attorney, Agent, or Firm*—Westerman, Hattori, Daniels & Adrian, LLP

(57) ABSTRACT

The present invention provides a less expensive driver having a common electric motor for individually driving a fluid pressure pump and a transport mechanism. The inventive driver (1) comprises a hydraulic cylinder (8), a hydraulic pump (6) for supplying a working fluid to the hydraulic cylinder (8), and a transport mechanism (3) for driving a pivot arm (89) to pivot the pivot arm (89). The driver (1) further comprises a common electric motor (4) for driving the hydraulic pump (6) and the transport mechanism (3), and switching means (5) for connecting the electric motor (4) switchably to the hydraulic pump (6) and to the transport mechanism (3), wherein one of the hydraulic pump (6) and the transport mechanism (3) connected to the electric motor (4) is driven by the electric motor (4).

6 Claims, 3 Drawing Sheets

DRIVER AND AUTOMATIC PALLET CHANGER HAVING THE SAME

BACKGROUND OF THE INVENTION

1. Field of the Invention

The present invention relates to a driver for driving a fluid pressure pump and a transport mechanism by a common electric motor, and to an automatic pallet changer having such a driver.

2. Description of the Prior Art

Some of machine tools such as machining centers have an automatic pallet changer for exchanging a pallet placed in a machining area where a workpiece is machined and a pallet placed in a working area where a workpiece is attached to and detached from the pallet.

The automatic pallet changer includes a pivot arm, and a driver including a hydraulic unit and a transport mechanism. The hydraulic unit includes a hydraulic cylinder for moving up and down the pivot arm, a hydraulic pump for supplying a working fluid to the hydraulic cylinder, and an electric motor for driving the hydraulic pump. The transport mechanism includes a plurality of gears for driving the pivot arm to pivot the pivot arm, and is driven by a servo motor provided separately from the hydraulic unit.

In the automatic pallet changer, the hydraulic pump is driven by the electric motor to actuate the hydraulic cylinder, whereby the pivot arm is moved up. Thus, the pallets respectively placed in the machining area and in the working area are received and retained by the pivot arm. In turn, the transport mechanism is driven by the servo motor to pivot the pivot arm, whereby one of the pallets is transported from the machining area to the working area and the other pallet is transported from the working area to the machining area. When the other pallet is located above a table in the machining area and the one pallet is located above a support base in the working area, the servo motor is stopped, and then the hydraulic pump is driven by the electric motor to move down the hydraulic cylinder and the pivot arm. Thus, the pallets retained on the pivot arm are respectively placed on the table in the machining area and on the support base in the working area.

In the conventional automatic pallet changer, however, the electric motor for actuating the hydraulic pump and the servo motor for driving the transport mechanism are separately provided. Therefore, the size of the driver and, hence, the size of the automatic pallet changer are increased, making it difficult to reduce the costs thereof. Further, the provision of the two electric motors requires separate driver circuits for controlling these electric motors, thereby preventing cost reduction.

It is an object of the present invention to provide a less expensive driver of a smaller size having a common electric motor for driving a fluid pressure pump and a transport mechanism, and to provide an automatic pallet changer having such a driver.

SUMMARY OF THE INVENTION

The driver according to the present invention comprises an actuator, a fluid pressure pump for supplying a working fluid to the actuator, and a transport mechanism for driving a movable body to move the movable body. The driver further comprises a common electric motor for driving the fluid pressure pump and the transport mechanism, and switching means for connecting the electric motor switchably to the fluid pressure pump and to the transport mechanism, wherein one of the fluid pressure pump and the transport mechanism connected to the electric motor is driven by the electric motor.

In the driver, the electric motor is connected to the fluid pressure pump by the switching means when the actuator is to be driven. By driving the fluid pressure pump by the electric motor, the working fluid is supplied to the actuator to drive the actuator. When the movable body is to be moved, the switching means switches the connection of the electric motor from the fluid pressure pump to the transport mechanism to connect the electric motor to the transport mechanism. Then, the transport mechanism is driven by the electric motor to move the movable body. In the driver, the switching means thus switches the connection of the electric motor to connect the electric motor selectively to the fluid pressure pump and to the transport mechanism, so that the fluid pressure pump and the transport mechanism can individually be driven.

In the driver, the fluid pressure pump and the transport mechanism are individually driven by the single common electric motor, which is switchably connected thereto by the switching means. This eliminates the need for providing separate electric motors for the fluid pressure pump and for the transport mechanism, allowing for size reduction and cost reduction of the driver.

The aforesaid driver is advantageously applicable to an automatic pallet changer. That is, the automatic pallet changer comprises: a pivot arm; an actuator for moving up and down the pivot arm to transfer pallets to/from the pivot arm in a machining area and in a working area; a fluid pressure pump for supplying a working fluid to the actuator; a transport mechanism for driving the pivot arm to pivot the pivot arm between the machining area and the working area; a common electric motor for driving the fluid pressure pump and the transport mechanism; and switching means for connecting the electric motor switchably to the fluid pressure pump and to the transport mechanism; wherein one of the fluid pressure pump and the transport mechanism connected to the common electric motor is driven by the common electric motor.

In the automatic pallet changer, the electric motor is first connected to the fluid pressure pump by the switching means for driving the fluid pressure pump. Thus, the actuator is driven to move up the pivot arm, whereby the pallets are received on the pivot arm in the machining area and in the working area. In turn, the switching means switches the connection of the electric motor from the fluid pressure pump to the transport mechanism to connect the electric motor to the transport mechanism for driving the transport mechanism. Thus, the pivot arm is driven to be pivoted, whereby one of the pallets is transported from the machining area to the working area and the other pallet is transported from the working area to the machining area. Thereafter, the electric motor is again connected to the fluid pressure pump by the switching means to drive the fluid pressure pump. Thus, the actuator is driven to move down the pivot arm, whereby the pallets are placed in the machining area and in the working area.

In the automatic pallet changer, the fluid pressure pump and the transport mechanism are individually driven by the single common electric motor, which is switchably connected thereto by the switching means. This eliminates the need for providing separate electric motors for the fluid pressure pump and for the transport mechanism, allowing for size reduction and cost reduction of the automatic pallet changer.

It is preferred to employ a stepping motor as the electric motor and to employ an electro-magnetic clutch as the switching means.

DESCRIPTION OF THE PREFERRED EMBODIMENT

Figure 1:
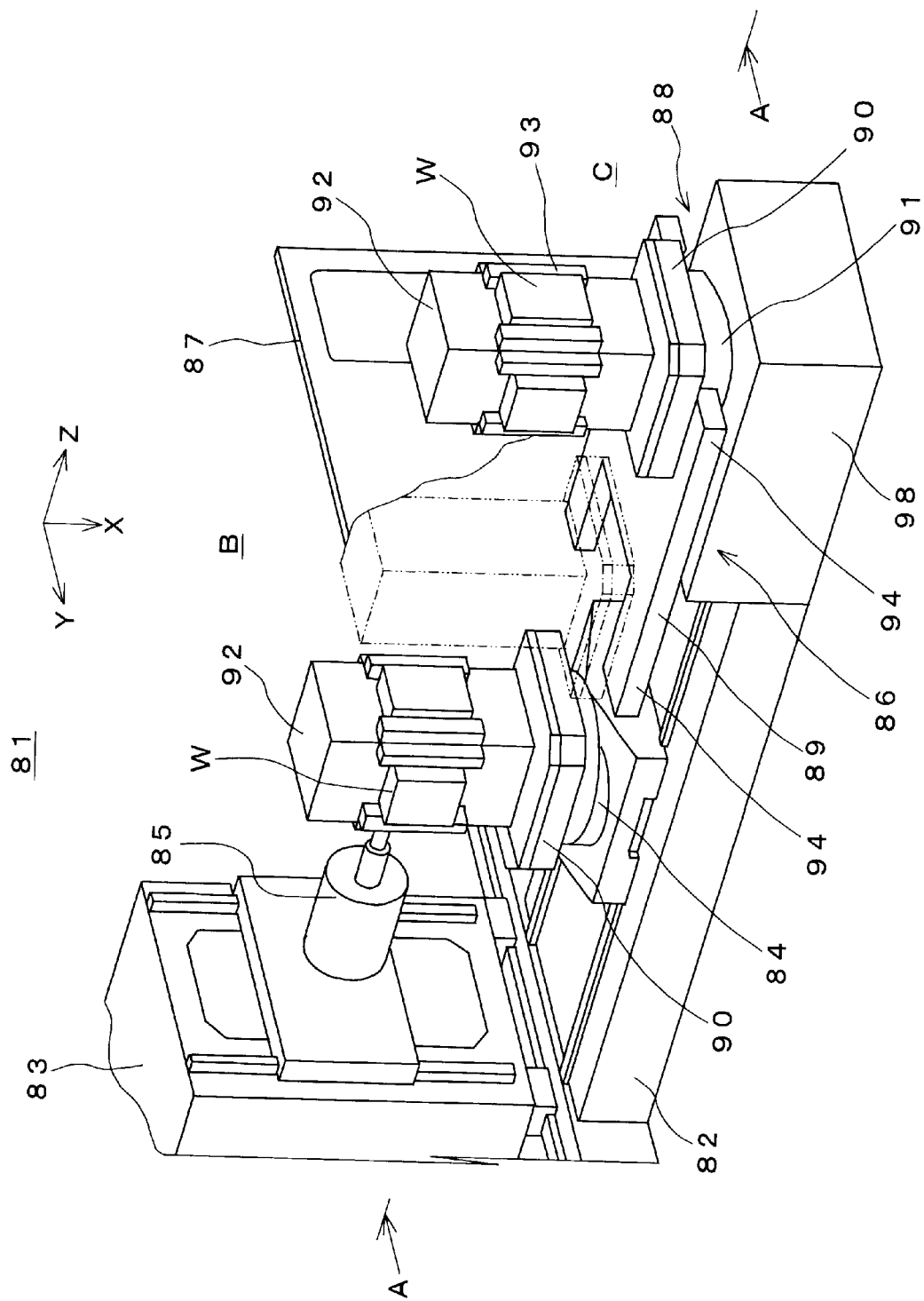
FIG. 1 is a perspective view illustrating a machine tool having a driver and an automatic pallet changer according to the present invention.
Figure 2:
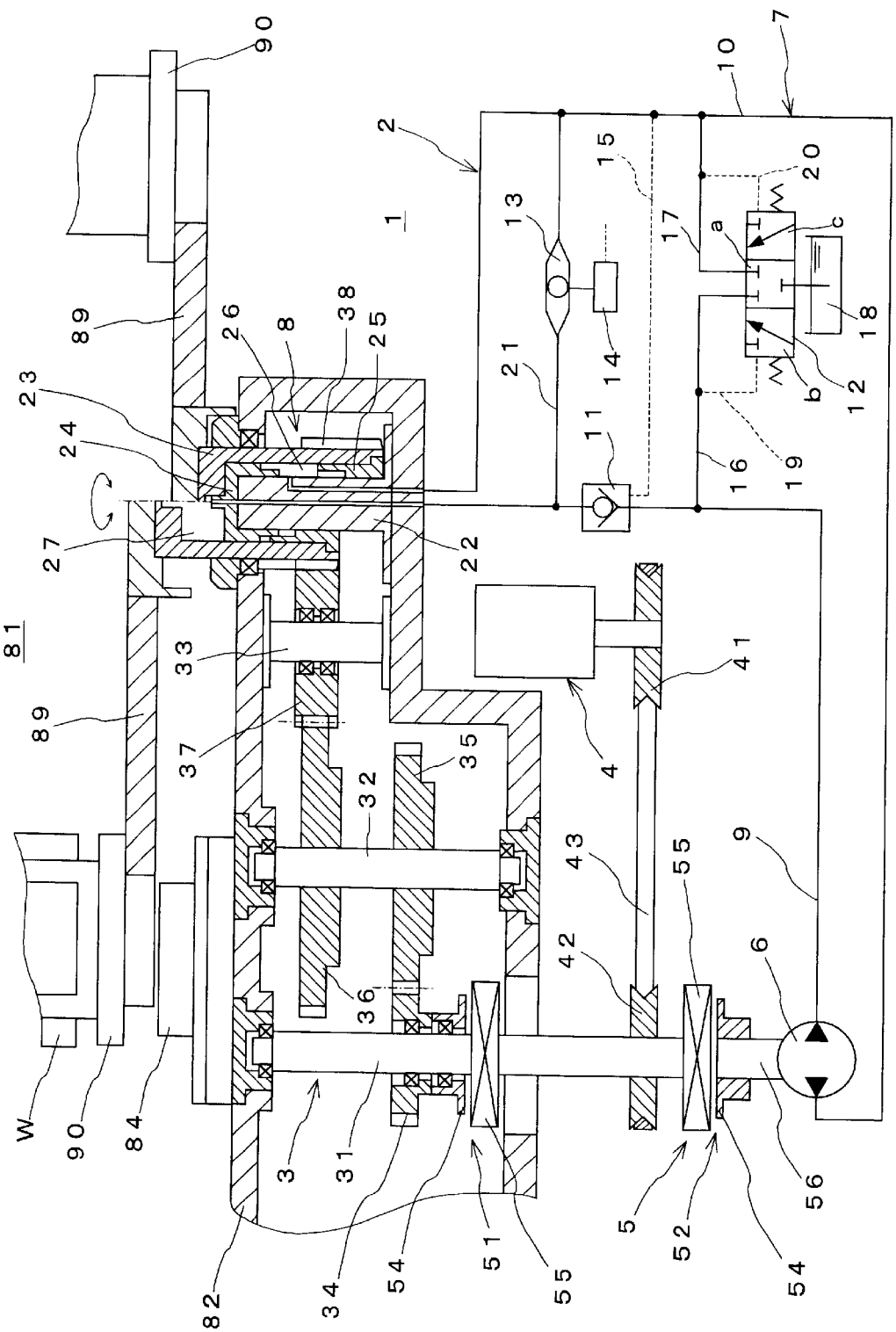
FIG. 2 is a sectional view of the automatic pallet changer as seen in a direction A—A in FIG. 1.
Figure 3:
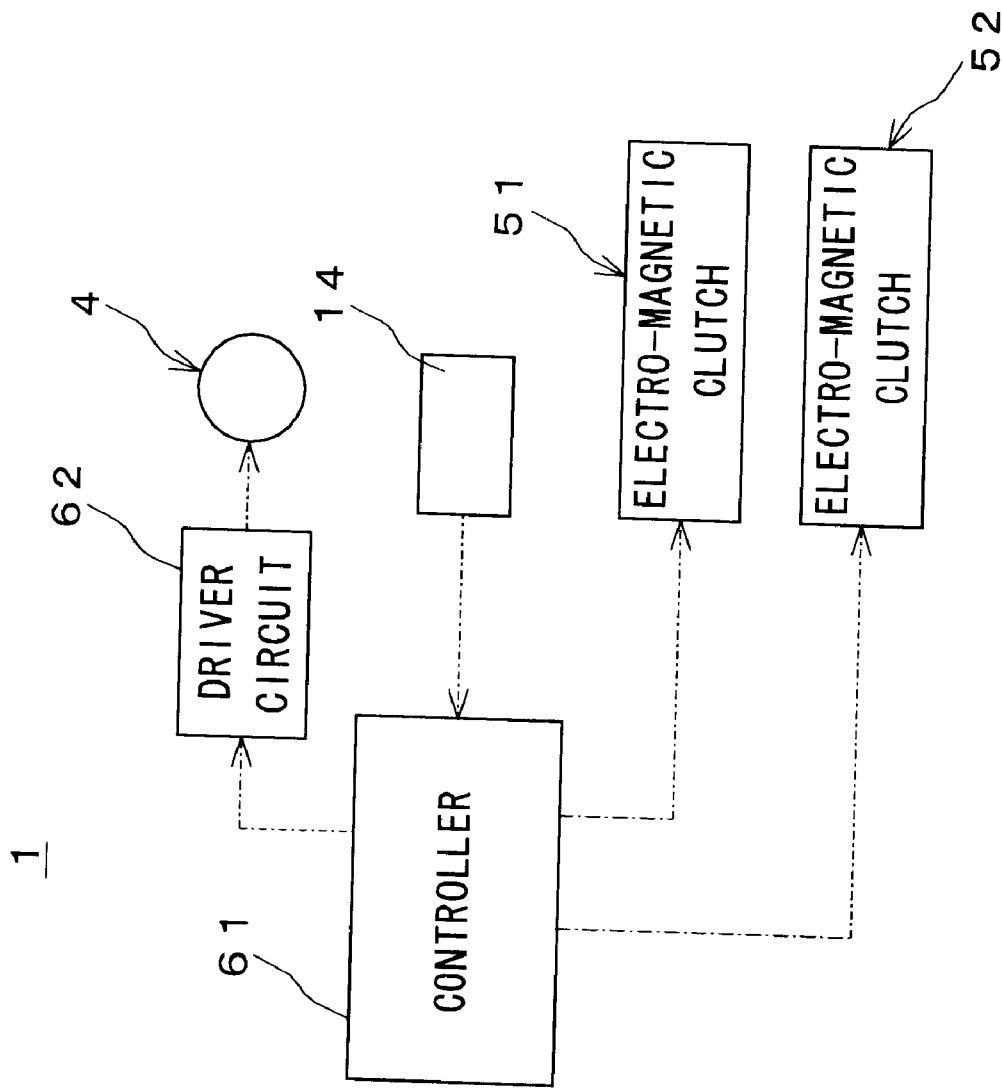
FIG. 3 is a block diagram illustrating a control system for the inventive automatic pallet changer.

A driver and an automatic pallet changer having the driver in accordance with an embodiment of the present invention will hereinafter be described with reference to FIGS. 1 to 3. An explanation will be given to a machine tool including the driver and the automatic pallet changer. FIG. 1 is a perspective view illustrating the machine tool. FIG. 2 is a sectional view of the automatic pallet changer as seen in a direction A—A in FIG. 1, and FIG. 3 is a block diagram illustrating a control system for the automatic pallet changer.

In FIG. 1, the machine tool 81 is, for example, a horizontal machining center (hereinafter referred to as "machining center 81"), and includes a bed 82, a column 83, a table 84, a spindle head 85, and an automatic pallet changer 86.

As shown in FIG. 1, the column 83 is disposed upright on the bed 82 and guided by a linear guide so as to be reciprocally movable along the Y-axis. The table 84 is located in front of the column 83 on the bed 82. The table 84 is guided by a linear guide so as to be reciprocally movable along the Z-axis. The table 84 supports a pallet 90 in a horizontally rotatable manner. The spindle head 85 is provided on the column 83 on the side of the table 84. The spindle head 85 has a tool for machining a workpiece W and a main spindle for turning the tool at a high speed, and is guided by a linear guide so as to be reciprocally movable along the X-axis.

As shown in FIG. 1, the automatic pallet changer 86 has a partition plate 87, which partitions a space in the machining center 81 into a machining area B where the workpiece W is machined on the table 84 and a working area C where the workpiece W is attached to and detached from the pallet. The automatic pallet changer 86 includes a pallet support mechanism 88, a pivot arm 89, and a driver 1 (shown in FIG. 2).

As shown in FIG. 1, the pallet support mechanism 88 is opposed to the table 84 in the working area C. The pallet support mechanism 88 has a support base 91 for supporting a pallet 90, and the support base 91 is supported in a horizontally rotatable manner on a platform 98. Rectangular clamping block 92 are respectively provided upright on the pallets 90 in the areas B and C. Workpieces W are fixed onto outer peripheral faces of the clamping block 92 by clamps 93.

As shown in FIG. 1, the pivot arm 89 extends into the areas B and C. The pivot arm 89 includes pallet holders 94 provided on opposite sides thereof for holding the pallets 90. The pivot arm 89 is moved up and down and pivoted by the driver 1 shown in FIG. 2 for exchanging the pallet 90 placed on the table 84 in the machining area B and the pallet 90 placed on the support base 91 in the working area C.

The construction of the driver 1 will more specifically be described with reference to FIG. 2. In FIGS. 1 and 2, like components are denoted by like reference characters.

In FIG. 2, the driver 1 is disposed, for example, in and around the bed 82 of the machining center 81, and includes a hydraulic unit 2, a transport mechanism 3, an electric motor 4, switching means 5, and a controller 61 (shown in FIG. 3). The driver 1 causes the hydraulic unit 2 to move up and down the pivot arm 89, and causes the transport mechanism 3 to pivot the pivot arm 89.

The hydraulic unit 2 includes a hydraulic pump 6, a hydraulic circuit 7, and an actuator 8. The hydraulic pump 6 is a bi-directional pump capable of discharging a working fluid in two directions, and is connected to the hydraulic circuit 7. The hydraulic pump 6 discharges the working fluid under pressure to supply the working fluid to the actuator 8 through the hydraulic circuit 7.

The hydraulic circuit 7 includes main pipes 9, 10 connected to ports of the hydraulic pump 6, a check valve 11, a selector valve 12, and a shuttle valve 13. The main pipes 9, 10 are further connected to the actuator 8. The check valve 11 is provided in the main pipe 9 to permit only passage of a stream of the working fluid flowing from the hydraulic pump 6. The check valve 11 is connected to the main pipe 10 via a pilot pipe 15, and adapted to be forcibly opened by a stream of the working fluid introduced through the pilot pipe 15. The selector valve 12 is connected to the main pipes 9 and 10 via branch pipes 16 and 17, respectively, in a position between the check valve 11 and the hydraulic pump 6. The selector valve 12 is connected to an oil tank 18, and has a de actuation position (a) at which communication between the branch pipes 16, 17 and the oil tank 18 is interrupted (the valve is closed) when the hydraulic unit 2 is deactuated. The selector valve 12 is further connected to the branch pipes 16 and 17 via pilot pipes 19 and 20, respectively, for introduction of the working fluid into the selector valve 12, and further has actuation positions (b) and (c) at which the communication between the branch pipe 16 and the oil tank 18 and the communication between the branch pipe 17 and the oil tank 18 are respectively allowed (the valve is opened). The shuttle valve 13 is provided in a connection pipe 21 connected to the main pipes 9, 10 in a position between the check valve 11 and the actuator 8. The shuttle valve 13 introduces a higher pressure stream of the working fluid flowing through either of the main pipes 9, 10 into a pressure switch 14. The pressure switch 14 detects the pressure of the working fluid introduced from the shuttle valve 13, and outputs a detection signal to the controller 61 (shown in FIG. 3).

The actuator 8 is a hydraulic cylinder (hereinafter referred to as "hydraulic cylinder 8") to be actuated by the working fluid, and is disposed in the bed 82. The hydraulic cylinder 8 includes a piston shaft 22 and a piston 23. The piston shaft 22 is fixedly provided upright in the bed 82, and has a bush 24 provided at a distal end thereof. The piston 23 has a cup-like shape having an open end. The bush 24 of the piston shaft 22 is inserted into the piston 23 from the open end thereof, so that the piston 23 is fitted around the piston shaft 22 slidably with respect to the piston shaft 22. The open end of the piston 23 is closed by a bush 25 slidably fitted around the piston shaft 22. Thus, pressure chambers 26 and 27 are defined between the bushes 24 and 25 and between the bush 24 and the ceiling of the piston 23, respectively, in the hydraulic cylinder 8. The pressure chambers 26 and 27 are respectively connected to the main pipes 9 and 10 via communication channels formed in the piston shaft 22. The hydraulic cylinder 8 supports the pivot arm 89 on the top of the piston 23 thereof.

In the hydraulic unit 2, the working fluid is discharged into the main pipe 9 by driving the hydraulic pump 6. The working fluid is introduced into the pressure chamber 27 through the check valve 11 and one of the communication channels of the piston shaft 22, thereby moving up the piston 23 of the hydraulic cylinder 8. Thus, the pivot arm 89 is moved up. Further, the working fluid is discharged into the main pipe 10 from the hydraulic pump 6 in the hydraulic unit 2. The working fluid is introduced into the pressure chamber 26 through the other communication channel of the piston shaft 22 and, at the same time, introduced into the check valve 11 through the pilot pipe 15, thereby forcibly opening the check valve 11. Thus, the piston 23 is moved down while the working fluid is returned into the hydraulic pump 6 from the pressure chamber 27 through the main pipe 10 and the check valve 11. Thus, the pivot arm 89 is moved down.

The transport mechanism 3 is a reduction gear mechanism provided in the bed 82 and includes, for example, three gear shafts 31 to 33 and a plurality of gears 34 to 38. The respective gear shafts 31 to 33 are provided parallel to each other in the bed 82. The gear shafts 31, 32 are rotatably supported by the bed 82, and the gear shaft 33 is fixedly supported by the bed 82. The gear shaft 31 projects below from the bed 82 to extend to the vicinity of the hydraulic pump 6. The gear 34 is supported rotatably about the gear shaft 31 in the bed 82, and the gears 35, 36 are fixedly supported around the gear shaft 32. The gear 37 is supported rotatably about the gear shaft 33, and the gear 38 is formed on an outer circumferential portion of the piston 23. The gears 34 and 35, the gears 36 and 37, and the gears 37 and 38 are meshed with each other.

When the gear shaft 31 is rotated, the transport mechanism 3 transmits the rotational motion to the gear 38 of the piston 23 with the rotation speed being reduced by means of the respective gears 34 to 38. Thus, the piston 23 of the hydraulic cylinder 8 is rotated to pivot the pivot arm 89.

The electric motor 4 is, for example, a stepping motor (hereinafter referred to as "stepping motor 4") whose rotation angle can be controlled with a high level of accuracy. A pulley 41 is provided around a rotation shaft of the stepping motor 4. A transmission belt 43 is stretched between the pulley 41 and a pulley 42 fixedly supported by the gear shaft 31. The stepping motor 4 is connected to the controller 61 (shown in FIG. 3).

The gear shaft 31 is rotated by the stepping motor 4 via the pulley 41, the transmission belt 43 and the pulley 42 for driving the transport mechanism 3 and the hydraulic pump 6.

The switching means 5 includes two electro-magnetic clutches 51, 52. The electro-magnetic clutches 51, 52 each include a clutch disk 54, a clutch cover 55 having a magnetization coil, and the like. The electro-magnetic clutch 51 is located adjacent the gear 34 in the bed 82. The clutch disk 54 of the electro-magnetic clutch 51 is supported rotatably about the gear shaft 31 so as to be coupled to the gear 34, and the clutch cover 55 is fixedly supported around the gear shaft 31. The electro-magnetic clutch 52 is provided adjacent the hydraulic pump 6. The clutch disk 54 of the electro-magnetic clutch 52 is fixedly supported around a drive shaft 56 of the hydraulic pump 6, and the clutch cover 55 is fixed to a distal end of the gear shaft 31.

The switching means 5 magnetizes the magnetization coil of the electro-magnetic clutch 51 to couple the clutch disk 54 to the clutch cover 55, whereby the stepping motor 4 is connected to the transport mechanism 3. When the electro-magnetic clutch 51 is demagnetized, the stepping motor 4 is disconnected from the transport mechanism 3. Further, the switching means 5 magnetizes the magnetization coil of the electro-magnetic clutch 52 to couple the clutch disk 54 to the clutch cover 55, whereby the connection of the stepping motor 4 is switched from the transport mechanism 3 to the hydraulic pump 6 to connect the stepping motor 4 to the hydraulic pump 6.

As shown in FIG. 3, the controller 61 is connected to a driver circuit 62 for the stepping motor 4. The driver circuit 62 outputs a pulse signal on the basis of a drive command of the controller 61 to control the driving of the stepping motor 4. The controller 61 is further connected to the electro-magnetic clutches 51, 52 to control the magnetization and demagnetization of the respective electro-magnetic clutches 51, 52. The controller 61 further controls the driving of the stepping motor 4 on the basis of the detection signal applied from the pressure switch 14.

With reference to FIGS. 1 to 3, an explanation will be given to the operations of the driver 1 and the automatic pallet changer 86 as well as to the operation of the machining center 81.

In FIG. 1, the tool of the spindle head 85 is moved along the three axes (X-, Y- and Z-axes) by reciprocally moving the column 83, the table 84 and the spindle head 85 in the machining center 81, whereby the workpieces W on the table 84 are machined. The table 84 is horizontally rotated to locate each of the workpieces W fixed to the clamping block 92 in an opposed relation with respect to the tool for successively machining the workpieces W. In the working area C, a pallet 90 is mounted on the support base 91, and workpieces W to be next machined are fixed to the clamping block 92 for a preparatory operation.

Upon completion of the machining in the machining center 81, the automatic pallet changer 86 exchanges the pallet 90 in the machining area B and the pallet 90 in the working area C as shown in FIG. 1.

The exchange of the pallets 90 is achieved by moving up and down and pivoting the pivot arm 89 by means of the driver 1 as shown in FIG. 2. As shown in FIG. 3, the controller 61 outputs a magnetization command (electric power) to the electro-magnetic clutch 52 to magnetize the electric-magnetic clutch 52 for connection between the stepping motor 4 and the hydraulic pump 6. The controller 61 outputs a drive command to the driver circuit 62 to drive the stepping motor 4 on the basis of a pulse signal of the driver circuit 62. Thus, the stepping motor 4 is rotated in a regular direction, whereby the hydraulic pump 6 is driven for rotation thereof (in a normal direction) via the pulley 41, the transmission belt 43, the pulley 42, the gear shaft 31 and the electro-magnetic clutch 52 as shown in FIG. 2. At this time, the electro-magnetic clutch 51 is disconnected from the transport mechanism 3, so that the gear shaft 31 is rotated relatively to the clutch disk 54 of the electro-magnetic clutch 51 and the gear 34. Therefore, only the hydraulic pump 6 is driven for rotation thereof.

As shown in FIG. 2, the hydraulic pump 6 discharges the working fluid to the main pipe 9 under pressure. The working fluid opens the check valve 11, and flows through the main pipe 9 thereby to be introduced into the pressure chamber 27 of the hydraulic cylinder 8. Thus, the piston 23 of the hydraulic cylinder 8 is moved up together with the pivot arm 89. At this time, the pivot arm 89 receives the pallets 90 (the workpieces W and the clamping block 92) from the table 84 in the machining area B and from the support base 91 in the working area C while being moved up. The working fluid discharged into the main pipe 9 is introduced into the selector valve 12 through the pilot pipe 19. When the pressure of the working fluid increases to higher than a predetermined level, the selector valve 12 is switched from the de actuation position (a) to the actuation position (b) to connect the oil tank 18 to the branch pipe 17. Thus, the working fluid contained in the oil tank 18 flows into the main pipe 10 thereby to be supplied into the hydraulic pump 6.

Upon the reception of the pallets 90 on the pivot arm 89, as shown in FIG. 3 the controller 61 cancels the drive command applied to the driver circuit 62 thereby to deactuate the stepping motor 4. Thus, the driving of the hydraulic pump 6 is stopped, so that the supply of the working fluid into the pressure chamber 27 of the hydraulic cylinder 8 is stopped. At this time, the check valve 11 is closed, so that the piston 23 of the hydraulic cylinder 8 and the pivot arm 89 are retained at upper positions. The working fluid is also introduced into the shuttle valve 13 through the main pipe 9 and the connection pipe 21. Thus, the pressure switch 14 detects the inside pressure of the pressure chamber 27 of the hydraulic cylinder 8, and outputs a detection signal to the controller 61. Upon reception of the detection signal inputted from the pressure switch 14, the controller 61 judges that the pivot arm 89 and the like are moved down due to reduction in pressure, and rotates again the stepping motor 4 in the normal direction thereby to drive the hydraulic pump 6 for rotation thereof. Thus, the piston 23 of the hydraulic cylinder 8 is moved up together with the pivot arm 89 by the working fluid introduced into the pressure chamber 27.

After the stepping motor 4 is deactuated, the controller 61 demagnetizes the electro-magnetic clutch 52 as shown in FIG. 3 thereby to disconnect the stepping motor 4 from the hydraulic pump 6. At the same time, the controller 61 outputs a magnetization command (electric power) to the electro-magnetic clutch 51 to magnetize the electro-magnetic clutch 51, whereby the connection of the stepping motor 4 is switched from the hydraulic pump 6 to the transport mechanism 3 to connect the stepping motor 4 to the transport mechanism 3. Further, the controller 61 outputs a drive command to the driver circuit 62, and drives the stepping motor 4 on the basis of a pulse signal of the driver circuit 62. The pulse signal outputted from the driver circuit 62 causes the stepping motor 4 to rotate the pivot arm 89 by 180 degrees. Thus, as shown in FIG. 2 the stepping motor 4 drives the transport mechanism 3 for ration thereof via the pulley 41, the transmission belt 43, the pulley 42, the gear shaft 31 and the electro-magnetic clutch 51. At this time, the electro-magnetic clutch 52 is disconnected from the hydraulic pump 6, so that the gear shaft 31 is rotated together with the electro-magnetic clutch 51 and the gear 34. Thus, only the transport mechanism 3 is driven for rotation thereof.

As shown in FIG. 2, the transport mechanism 3 transmits the rotational motion from the stepping motor 4 to the piston 23 of the hydraulic cylinder 8 with the rotation speed being reduced by the gears 34 to 38, whereby the piston 23 is rotated together with the pivot arm 89. Thus, the pallet 90 in the working area C and the pallet 90 in the machining area B are transported into the machining area B and into the working area C, respectively, by the pivot arm 89 for exchange of the pallets 90. The stepping motor 4 is rotated by a degree corresponding to 180-degree rotation of the pivot arm 89 and stopped on the basis of the pulse signal outputted from the driver circuit 62. At the same time, the pivot arm 89 is rotated by 180 degrees and stopped, whereby the pallets 90 are positioned on the table 84 in the machining area B and on the support base 91 in the working area C with a higher level of accuracy.

As shown in FIG. 3, the controller 61 demagnetizes the electro-magnetic clutch 51 to disconnect the stepping motor 4 from the transport mechanism 3, and outputs a magnetization command (electric power) to the electro-magnetic clutch 52, whereby the connection of the stepping motor 4 is switched from the transport mechanism 3 to the hydraulic pump 6 to connect the stepping motor 4 to the hydraulic pump 6. Further, the controller 61 outputs a drive command to the driver circuit 62, and drives the stepping motor 4 on the basis of a pulse signal of the driver circuit 62. Thus, the stepping motor 4 is rotated in a reverse direction, so that the hydraulic pump 6 is driven for rotation thereof (in a reverse direction) via the pulley 41, the transmission belt 43, the pulley 42, the gear shaft 31 and the electro-magnetic clutch 52 as shown in FIG. 2. At this time, the electro-magnetic clutch 51 is disconnected from the transport mechanism 3, so that the gear shaft 31 is rotated relatively to the clutch disk 54 of the electro-magnetic clutch 51 and the gear 34. Therefore, only the hydraulic pump 6 is driven for rotation thereof.

As shown in FIG. 2, the hydraulic pump 6 discharges the working fluid to the main pipe 10 under pressure. The working fluid flows through the main pipe 10 thereby to be introduced into the pressure chamber 26 of the hydraulic cylinder 8. Further, the working fluid is introduced into the check valve 11 through the pilot pipe 15 thereby to forcibly open the check valve 11. Thus, the working fluid is returned from the pressure chamber 27 of the hydraulic cylinder 8 to the main pipe 10, whereby the piston 23 is moved down together with the pivot arm 89. At this time, the pivot arm 89 transfers the pallets 90 onto the table 84 in the machining area B and onto the support base 91 in the working area C while being moved down. Thus, the exchange of the pallets is completed. The working fluid discharged into the main pipe 10 is introduced into the selector valve 12 through the pilot pipe 20. When the pressure of the working fluid is increased to higher than a predetermined level, the selector valve 12 is switched from the actuation position (b) to the actuation position (c) to connect the oil tank 18 to the branch pipe 16. Thus, the working fluid contained in the oil tank 18 flows out into the main pipe 9 thereby to be supplied to the hydraulic pump 6.

When the pallet exchange is performed again, the pivot arm 89 is moved up to receive pallets 90 thereon, and rotated by 180 degrees in the reverse direction to transport the pallets 90 onto the table 84 in the machining area B and onto the support base 91 in the working area C. Then, the pivot arm 89 is moved down to place the pallets 90 in the respective areas B and C. When the pallet exchange is successively performed, the pivot arm 89 is not rotated by 360 degrees but rotated by 180 degrees in the normal and reverse directions.

In the driver 1 and the automatic pallet changer 86 according to the embodiment of the present invention, the connection of the common electric motor 4 is switched between the hydraulic pump 6 and the transport mechanism 3 by the switching means 5, so that the hydraulic pump 6 and the transport mechanism 3 are individually driven by the single common electric motor 4. This eliminates the need for providing separate electric motors for the hydraulic pump 6 and for the transport mechanism 3, allowing for size reduction and cost reduction of the driver 1 and the automatic pallet changer 86 and, hence, allowing for size reduction and cost reduction of the machine tool.

The present invention is not limited to the driver 1 and the automatic pallet changer 86 shown in FIGS. 1 to 3, but may be embodied in the following ways.

(1) The driver 1 is applied not only to the machine tool but also to any apparatus having a fluid pressure pump and a transport mechanism.

(2) The electric motor 4 is not limited to the stepping motor, but may be a servo motor or the like.

(3) The switching means 5 is not limited to the electro-magnetic clutches 51, 52, but may be any switching means which is capable of connecting the electric motor 4 switchably to the hydraulic pump 6 and to the transport mechanism 3.

(4) The transport mechanism 3 is not necessarily adapted to pivot the pivot arm 89, but may be adapted to linearly move a movable body by a rack and a pinion.

(5) When the driver 1 is applied to the machine tool, the controller 61 may double as a controller for controlling the entire machine tool.

(6) The driver 1 is not limited to the combination of the hydraulic unit and the transport mechanism, but may be a combination of a pneumatic circuit and a transport mechanism.

(7) The number of the gears of the transport mechanism 3 and the construction of the hydraulic circuit 7 may be selected as desired.

What is claimed is:

1. A driver comprising:

an actuator;

a fluid pressure pump for supplying a working fluid to the actuator;

a transport mechanism for driving a movable body to move the movable body;

a common electric motor for driving the fluid pressure pump and the transport mechanism; and switching means for connecting the electric motor switchably to the fluid pressure pump and to the transport mechanism;

wherein one of the fluid pressure pump and the transport mechanism that is mechanically connected to the electric motor is driven by the electric motor.

2. A driver as set forth in claim 1, wherein the electric motor is a stepping motor.

3. A driver as set forth in claim 1 or 2, wherein the switching means is an electro-magnetic clutch.

4. An automatic pallet changer comprising:

a pivot arm;

an actuator for moving up and down the pivot arm to transfer pallets to/from the pivot arm in a machining area and in a working area;

a fluid pressure pump for supplying a working fluid to the actuator;

a transport mechanism for driving the pivot arm to pivot the pivot arm between the machining area and the working area;

a common electric motor for driving the fluid pressure pump and the transport mechanism; and switching means for connecting the electric motor switchably to the fluid pressure pump and to the transport mechanism, wherein one of the fluid pressure pump and the transport mechanism connected to the electric motor is driven by the electric motor.

5. An automatic pallet changer as set forth in claim 4, wherein the electric motor is a stepping motor.

6. An automatic pallet changer as set forth in claim 4 or 5, wherein the switching means is an electro-magnetic clutch.

* * * * *